Patented Oct. 26, 1937

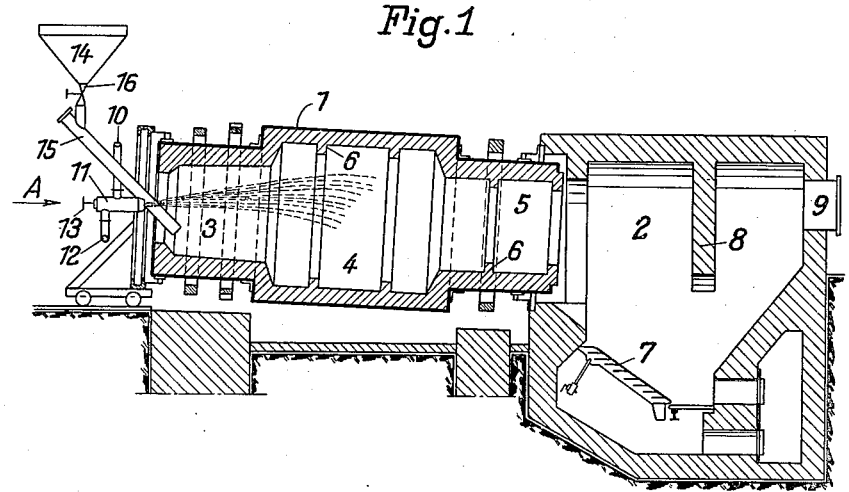
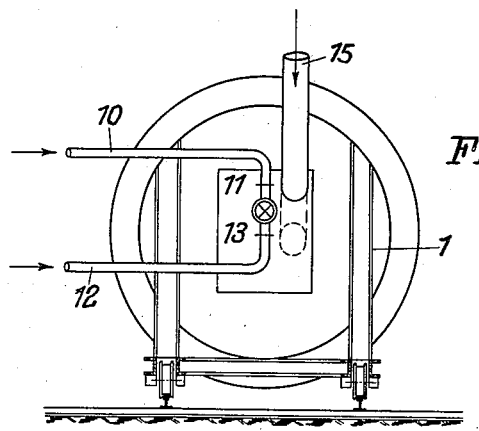

2,097,271

UNITED STATES PATENT OFFICE 2,097,271

METHOD FOR THE TREATMENT OF WASTE SULPHURIC ACID

Carl Paul Debuch and Ernst Markworth, Frankfort-on-the-Main, Germany, assignors to American Lurgi Corporation, New York, N. Y., a corporation of New York Application March 8, 1934, Serial No. 714,697
In Germany March 15, 1933

6 Claims. (Cl. 23—177)

The present invention relates to a method for the treatment of waste sulphuric acid.

It is well known that in many processes of the chemical industry, especially those of refining petroleum, great quantities of waste dilute sulphuric acid have been produced. This waste acid cannot be used directly for instance for the original uses, partly because of the dilution of the acid and partly because of the impurities. Various proposals have been suggested to concentrate the aforesaid waste acids. Many attempts at concentrating acid were uneconomical because of the losses suffered due to the reduction of sulphuric acid to sulphur dioxide. In view of the fact that relatively small quantities of organic substances have been sufficient to make the aforesaid reduction practically complete, it has also been proposed to use this method of reduction for the treatment of waste sulphuric acids to convert the total amount of sulphuric acid into sulphur dioxide from which concentrated sulphuric acid is produced by means of the chamber method or the contact method. The heat necessary for the reduction of the waste acids was supplied via closed chambers heated from the outside. The chambers were shaped similar to tunnel kilns or to chambers with inclined hearth-plates, the lower surface of which was heated and the upper surface of which was used for the acid undergoing concentration. This process, however, had the disadvantage that the organic substances contained in the sulphuric acid were partly carbonized by the heating. Deposits, crusts or projections of the carbonized material formed in the muffle-like vessel, in consequence of which the conduction of heat was detrimentally affected. On account of this single reason, economical operation could not be assured. A further difficulty was involved in cleaning the muffles of deposits, crusts and incrustations and rendering them fit for use again. In addition, distillation products entered the succeeding apparatus together with the escaping sulphur dioxide which makes the conversion of sulphur dioxide into trioxide difficult or, in some cases, impossible. Similar difficulties were encountered in another prior process in which the heating gases were conveyed directly above the waste acid located in a rotary drum. At the same time, low temperatures were used which were only sufficient to degasify and to coke the waste acid while avoiding the combustion of the coke in the rotary drum. The escaping gases were diluted with heating gases and their content of noxious gases and vapors, originating from the decomposition of heated organic substances, was not much smaller than in the case of degasification by indirect heating. In order to eliminate the disadvantages of this process, attempts were made to mix waste acids intimately with a combustible substance, such as oil and to subject this mixture to combustion. The presence of sulphuric acid, however, disturbed the combustion of the oil. If it was desired to maintain the combustion process with reasonable certainty, it was necessary to use a very considerable amount of oil per unit weight of waste acid. This circumstance meant another disadvantage to wit:—the sulphur dioxide escaping from the waste sulphuric acid was very much diluted by gases produced by combustion of the oil. Generally, this dilution was so strong that it was not possible to treat the gases for producing sulphuric acid.

According to another prior known process, waste sulphuric acid with added air was injected into a chamber, previously heated to a high temperature, preferably above 700° centigrade, for example, by means of an oil burner. In some cases, when the waste acid contained very much combustible organic materials, it was not necessary to use auxiliary combustible substance after the combustion of the waste sulphuric acid was started and the oil-burner could be extinguished. It was proposed in the place of the oil-burner for the heating of a reduction chamber to use a sulphur combustion furnace or a pyrite burner as a high-temperature chamber in which the waste acid was injected, for example, in such a way that the waste acid was injected upon or above the burning sulphur or pyrites. In this manner, gases of high sulphur dioxide-concentration were obtained from the furnace. Practical difficulties were encountered in the combustion of waste acids in sulphur combustion or pyrite furnaces including the production of large quantities of dust-like coke and soot. The waste gases were likely to contain pitchy and bituminous substances. These impurities, as is well known, hindered the use of the gases for the production of sulphuric acid. A further disadvantage of the process was that too much coke was deposited in the combustion chamber which coke was not easily combustible and which coke contained too much sulphur to be used as a combustible for other purposes.

It is an object of the present invention to provide a method for converting dilute waste sulphuric acid to gaseous products including sulphur dioxide for the production of concentrated sulphuric acid.

It is another object of the invention to provide a method for the continuous treatment of waste sulphuric acid with a combustible material to effect the conversion of the acid to sulphur dioxide and to effect the production of concentrated sulphuric acid.

It is a further object of the invention to provide a process for the conversion of waste sulphuric acid to gaseous products including sulphur dioxide for the production of concentrated sulphuric acid involving the degasification of the waste acid and the coking of organic material followed by the burning of the coke and the radiation of heat for use in the degasification and coking.

It is also within the contemplation of the invention to provide a method for treating waste sulphuric acid with a combustible material in which the ratio of the amount of sulphuric acid plus the amount of water to the amount of carbon is such that there is sufficient carbon to reduce the sulphuric acid to sulphur dioxide and to generate sufficient heat for the aforesaid reduction, the evaporation of water and the raising of the temperature of the gases to the desired degree and the compensation for losses.

A further object of the invention is to provide a method for converting waste sulphuric acid by means of a combustible material to gaseous sulphur dioxide for the production of concentrated sulphuric acid and by the control of the amount of air for combustion.

Other objects and advantages will become apparent from the following description taken in conjunction with the drawing, in which:—

Fig. 1 is a sectional view of a furnace in which the present invention can be carried into practice; and Fig. 2 is an end elevational view of the furnace looking from the charging end of the furnace.

It has been discovered that the sulphuric acid contained in the waste acids can be reduced to sulphur dioxide by the impurities of the waste acid without difficulty in case the waste acid is introduced into a rotary tubular furnace, in which it is burned with the addition of combustible substances and a stream of air.

As combustible substances, a great variety of appropriate materials may be used including different kinds of coal, coke, oils, waste-materials of petroleum or vegetable oil refining such as acid-resins containing generally between 30% to 70% carbon and asphalt, tar, bleaching earths which have an oil-content between 25 and 50%, and the like. The rotary tubular furnace may also be equipped with auxiliary coal dust, gas, or oil burner.

In the first part or zone of the rotary tubular furnace, degasification and coking of the introduced material occurs. From the degasification zone, the produced coke progresses to a further part of the rotary tubular furnace in which it is burned. The combustion of the coke supplies the heat for the degasification of the combustible substances and for the decomposition of the waste sulphuric acid in the first zone. The heat required for the degasification is transmitted by radiation from the combustion zone to the first zone of the furnace. The waste sulphuric acid introduced into the furnace will be decomposed and converted to a vapor. The sulphur dioxide concentration in the waste gases can be kept so high that the waste gases can be treated for the production of concentrated sulphuric acid without any difficulty. The surprising fact is that the waste acid not only does not detrimentally affect the combustion process, but also assists the same. In this connection, it is of extreme importance to note that the walls of the rotary tubular furnace are heated to a very uniform high temperature by the combustion process and that the combustion of the fuel is taking place in the immediate neighborhood of the furnace walls. The waste acid itself cannot reach the spots where the combustion-process is occurring since it is decomposed before reaching there and the sulphuric acid and the water of the acid are vaporized. Besides it is possible to introduce the waste sulphuric acid into the furnace previously mixed with the combustible substances or to introduce them separately or finally the mixing process can be arranged to take place in the furnace itself.

The best results in the treatment of the waste sulphuric acid with a minimum consumption of auxiliary combustion can be realized in case the waste sulphuric acid is injected, for example, sprayed into the hearth of the rotary tubular furnace. Preferably, the spraying is effected in such a way that the outside jets of the spraying cone are directed so as not to touch the walls of the rotary tubular furnace.

A variety of shapes may be used for the rotary tubular furnace used to carry the present process into practice. Good results can be obtained with a rotary tubular furnace having a separate degasification chamber for the combustible at the inlet thereof and an adjoining combustion chamber having a diameter larger than that of the degasification chamber. Associated with the combustion chamber is a secondary combustion chamber which has a smaller diameter than the combustion chamber proper. In some instances, the combustion chamber may be slightly contracted so that the coke accumulating therein cannot be discharged but is burned completely or to a desired degree.

The rotary tubular furnace may also be equipped with nozzles for the introduction of the combustion air, and with agitating blades, retaining rings and similar devices known in conjunction with rotary tubular furnaces, while the degasification chamber can be equipped with scraping devices for removing the light deposits which may be formed. In consequence of the rotation of the furnace, of the continuous movement of the charge of the furnace, and of combustion process being initiated in the gas space of the degasification zone and being facilitated by the presence of combustion air and the re-radiation of heat from the combustion zone, the deposits will not be so considerable as to disturb the regularity of the operation of the furnace or even require frequent interruption of the same. On the contrary, the deposits may even be removed by hand without interfering with the operation.

In case the waste acids are injected by means of one or more nozzles, the nozzles are preferably arranged closely above the axis of the furnace and the injection is directed so that the jet spreads in the free space of the furnace in a region where the principal combustion process occurs. Care is to be taken that no waste sulphuric acid should occur or deposit on the glowing combustible or on the coke formed from the combustible and preferably not even on the walls of the furnace. According to the present invention the waste acid is decomposed in the gas space of the rotary tubular furnace, whereas the combustible and the coke, if any is formed from the decomposition of the waste acid, are burned in the closest proximity of the furnace walls by means of combustion air. In view of the fact that the liquid waste acid does not come in direct contact with the combustible or with the coke, or with the high temperature furnace walls, the possibility of irregular cooling within the furnace, which might cause retardation or complete interruption of the combustion process, especially when very large quantities of acid are introduced into the furnace, is substantially eliminated.

Discharge ports can be provided in the degasification chamber or in the combustion chamber through which part of the coke produced can be taken out. Of course, only so much coke should be taken that the combustion process can produce sufficient heat to cause the decomposition and reduction of the sulphuric acid and its conversion to gaseous state.

Auxiliary heating of the rotary tubular furnace may be of advantage in cases where the carbon contained in the mixture of waste acid and combustible substance is sufficient for the reduction of the acid to sulphur dioxide, but the heat produced by the combustion is insufficient to continuously maintain the necessary temperature in the furnace. The auxiliary heating may be effected, for example, by using oil, tar, asphalt or similar substances as a combustible. The auxiliary combustion equipment can be situated at any desirable place of the furnace, for example, at one of its ends. It is also possible to operate the rotary tubular furnace by means of oil or gas burners without introducing solid or liquid combustibles which are degasified and form coke in the degasification chamber of the furnace, if care is taken that the combustion of the fuel is likewise taking place in close proximity of the furnace walls and the decomposition of the waste sulphuric acid occurs in the gas space of the furnace.

For a better understanding of the invention, a preferred procedure will be described in conjunction with the drawing which illustrates a preferred apparatus for carrying the invention into practice.

The waste acid decomposition apparatus comprises essentially a rotary tubular furnace 1 and a stationary chamber 2. The rotary tubular furnace is provided with a degasification zone 3 and with the combustion or reduction zone proper for the waste acid 4. A secondary combustion zone 5 is located at the outlet end of the rotary furnace adjacent to the stationary chamber.

The interior of the furnace is lined with refractory walls which can be subdivided by a plurality of retaining rings 6. In stationary chamber 2 there is a grate 7 on which coke is burned which has not been used up in the rotary tubular furnace 1 and which falls over the outside rim of the secondary combustion chamber 5.

A deflection wall 8 in chamber 2 serves to precipitate from the gas stream coke dust and, at the same time, to obtain a thorough whirling of the gases escaping from the furnace. After this, the combustion gases are conducted through the outlet 9 to the place of utilization, for example, through a steam boiler to a contact sulphuric acid plant.

The feeding of the waste acid to the rotary furnace is effected by pipe 10 and a sprayer or vaporizer 11. Compressed air supplied from conduit 12 atomizes the waste acid in the form of a cone. The sprayer is equipped with an adjustment valve 13 which makes it possible to obtain the right mixture of air and waste acid under varying conditions of the waste acids. The atomizing process is regulated by adjustment of the air in such a manner that the spraying cone extends as far as possible into zone 4.

At the same time, a solid or liquid combustible is introduced from hopper 14 into the degasification zone through the charge-conduit 15. The combustible will first be degasified and coked in zone 3. In zone 4, the combustion of the solid or gaseous combustibles occurs. This combustion supplies the heat for the decomposition of the waste acid and for the degasification process in zone 3. The re-radiation of heat out of zone 4 into zone 3 has at the same time the effect that the combustion of the gaseous products of degasification starts in this zone. The combustion of the coke produced takes place principally in zone 4 and ends in zone 5, or in chamber 2. The introduction of a combustible, for example, of acid resin, is regulated by means of valve 16 so that the combustion heat suffices for effecting the reduction of the waste acid and at the same time the desired gas concentration is maintained in the escaping gas.

In case oil and/or gas are used instead of acid resin as the combustible, it is necessary to change the feed-in equipment accordingly. In such a case (e. g. for the oil-gas) a burner can be used heating the furnace in the way described hereinabove.

Example

Waste acids of the following composition have been treated in an apparatus illustrated in the drawing.

|  | Per cent |
|---|---|
| Sulphuric acid | 75 |
| Carbon | 18 |
| Water and other substances | 7 |

The acid was injected through a nozzle into the rotary tubular furnace at a rate of 800 kg. per hour. Furthermore, acid resin containing 30% sulphuric acid and 65% carbon was introduced through a charging equipment into the furnace. 150 kg. acid resin was needed per hour. A gas has been produced having a sulphur dioxide content which fluctuated between 4—5%. It was possible to produce from the foregoing $SO_2$ gas, sulphuric acid of about 98% by an adjoining sulphuric acid contact plant.

For the conversion of the sulphur dioxide-containing gases obtained according to the invention there is especially suitable the method of wet catalysis, in which the drying of the gases is superfluous because the water vapor contained in the original gases is not condensed with the separation of the sulphuric acid. A particularly advantageous process is one in which the sulphur dioxide-containing gases are passed, together with the quantities of water vapor arising from the combustion of the waste acids, over and/or through contact masses which are neutral towards water vapor, such as, for example, vanadium contact masses composed of vanadium on a base of potassium oxide, vanadium oxide, silicic acid, and the like, and which are then immediately condensed. This process, compared with the classic contact process, evidences a considerable advance, because now the gases may be passed, without any preliminary purification and with all of the water vapor generated by the combustion, directly over the contact catalyst, and then be condensed to sulphuric acid of a high percentage, without an eventual excess of water vapor acting injuriously.

Furthermore, through the condensation any pumping of larger quantities of sulphuric acid becomes unnecessary, so that altogether the apparatus can be made simply and cheaply.

If, in the sulphur dioxide-containing gases which are obtained by the process carried out according to the present invention, any dust or any distillation products or condensation products should still be contained in such quantities that they might act disturbingly on the execution of the contact process, an electric gas purification apparatus of known type may be inserted between the combustion and the contact processes.

The heat content of the waste gases evolved in the combustion furnace may be, and preferably is, utilized during the process. Thus the hot gases may be passed in heat-exchanging relation to the raw materials (i. e., either the sludge acid mix or the combustion air or both); or, they may be caused to impart some of their heat to the sulphur dioxide-containing gases at a different step of the process.

It is to be noted that the waste sulphuric acid can be injected either in the same direction or in opposite direction to the furnace gases in the rotary tubular furnace.

What is claimed is:—

1. The process for the treatment of waste sulphuric acid produced in industry and containing carbonaceous material which comprises feeding a combustible into a rotary tubular furnace in direct contact with the walls thereof, burning said combustible in the immediate proximity of said walls, rotating said furnace to successively expose various portions of said walls to the effect of said combustible to heat said walls to a high and uniform temperature and to cause the emission of radiant heat, introducing waste sulphuric acid as a spray into the gas space of said furnace, effecting evaporation of the water contained in the waste acid and decomposition of the sulphur compounds of said waste acid to sulphur dioxide by means of the radiant heat emitted by said rotating walls and by combustion of the carbonaceous material contained in the waste acid, controlling the introduction of said waste acid in such a manner that direct contact of the acid with said walls and interference with the burning of said combustible is prevented, and withdrawing sulphur dioxide containing gas from the furnace, said sulphur dioxide gas being adapted to be readily converted into sulphuric acid.

2. The process for the treatment of waste sulphuric acid produced in industry and containing carbonaceous material which comprises feeding a combustible into a rotary tubular furnace in direct contact with the walls thereof, burning said combustible in the immediate proximity of said walls; rotating said furnace to successively expose various portions of said walls to the effect of said combustible to heat said walls to a high and uniform temperature and to cause the emission of radiant heat, injecting waste sulphuric acid as a spray with air into the gas space of said furnace, decomposing said waste acid to form sulphur dioxide and water vapor by means of the radiant heat emitted by said rotating walls and by combustion of the carbonaceous material contained in the waste acid, controlling said spray of acid and air in such a manner that said decomposition is effected substantially solely in the furnace space by said radiant heat and that direct contact of said acid with said walls and interference with the combustion process is eliminated, and withdrawing sulphur dioxide containing gas from the furnace, said sulphur dioxide gas being adapted to be readily converted into sulphuric acid.

3. The process for the treatment of waste sulphuric acid produced in industry and containing carbonaceous material which comprises introducing a non-gaseous combustible in a rotary tubular furnace in direct contact with the walls thereof, injecting waste sulphuric acid as a spray with air into the gas space of said furnace, subjecting said combustible and said acid to radiant heat to degasify said combustible and to effect vaporization of water and sulphur compounds and coking of carbonaceous materials contained in said acid, causing said combustible to burn in the immediate proximity of the walls of said furnace at an intermediate portion thereof, rotating said furnace to successively expose various portions of said walls to the effect of said combustible to heat said walls to a high and uniform temperature and to cause the emission of radiant heat, converting the sulphur compounds of the acid to sulphur dioxide in the furnace space by means of said radiant heat, controlling said spray of acid and of air in such a manner that direct contact of the acid with said walls and interference with the burning of said combustible is prevented, regulating said combustion process to radiate back enough heat to cause said degasification of the fuel and said evaporation of said acid and coking of the carbonaceous materials of the said acid, and withdrawing sulphur dioxide containing gas from the furnace, said sulphur dioxide gas being adapted to be readily converted into sulphuric acid.

4. The process for the treatment of waste sulphuric acid produced in industry and containing carbonaceous material which comprises introducing a non-gaseous combustible into a preheating zone of a rotary tubular furnace in direct contact with the walls thereof, degasifying said combustible by the heat of said furnace, injecting waste sulphuric acid as a spray into the gas space of said preheating zone to effect therein evaporation of the water and of the sulphur compounds and coking of the carbonaceous materials of said acid, causing said combustible to burn in the immediate proximity of the walls of a combustion zone adjoining said preheating zone, rotating said furnace to successively expose various portions of said walls to the effect of said combustible to heat said walls to a high and uniform temperature and to cause the emission of radiant heat, decomposing the sulphur compounds of said waste acid to sulphur dioxide in the furnace space by means of said radiant heat, controlling the injection of said acid in such a manner that direct contact of the acid with said walls and interference with the burning of said combustible is prevented, regulating said combustion process to radiate back enough heat to maintain said preheating zone at the required temperature, and withdrawing sulphur dioxide containing gas from the furnace, said sulphur dioxide gas being adapted to be readily converted into sulphuric acid.

5. The process for the treatment of waste sulphuric acid produced in industry and containing carbonaceous material which comprises introducing a non-gaseous combustible into a preheating zone of a rotary tubular furnace in direct contact with the walls thereof, degasifying said combustible by the heat of said furnace, injecting waste sulphuric acid as a spray with air into the gas space of said preheating zone to effect therein evaporation of water and of the sulphur compounds and coking of carbonaceous materials of the acid, causing said combustible to burn in the immediate proximity of the walls of a combustion zone adjoining to and having a larger diameter than said preheating zone, rotating said furnace to successively expose various portions of said walls to the effect of said combustion to heat said walls to a high and uniform temperature and to cause the emission of radiant heat, controlling said spray of acid to decompose same in the furnace space by said radiant heat and to prevent direct contact thereof with the furnace walls, completing combustion of the remaining combustible materials, and withdrawing sulphur dioxide gas from the furnace, said sulphur dioxide gas being adapted to be readily converted into sulphuric acid.

6. The process set forth in claim 1 in which the combustible material used is acid resin.

CARL PAUL DEBUCH.
ERNST MARKWORTH.